Oct. 18, 1966  N. LAING  3,279,209
CROSS FLOW MACHINES AND AIR CONDITIONER UNITS
INCORPORATING SUCH MACHINES
Original Filed April 15, 1964

INVENTOR
NIKOLAUS LAING
BY
ATTORNEYS

INVENTOR
NIKOLAUS LAING
BY Jennie Edwards,
Morton, Taylor & Adams
ATTORNEYS

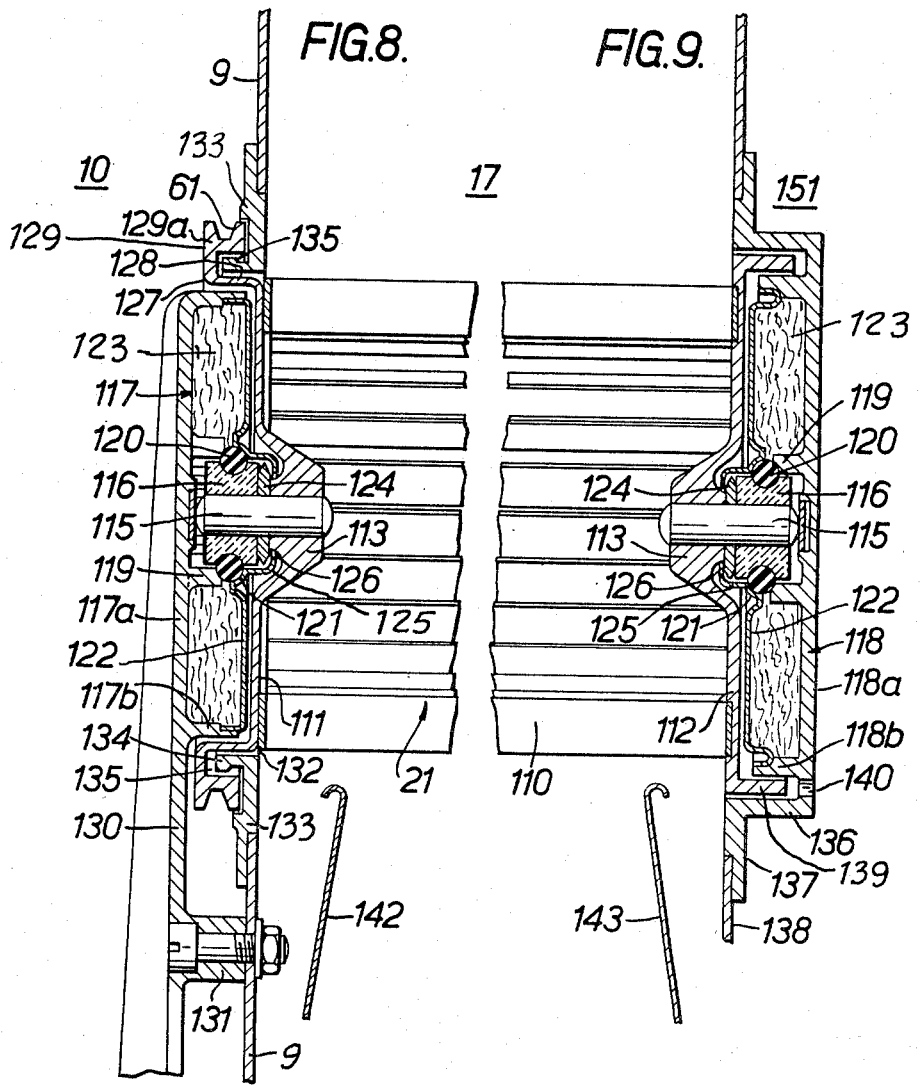

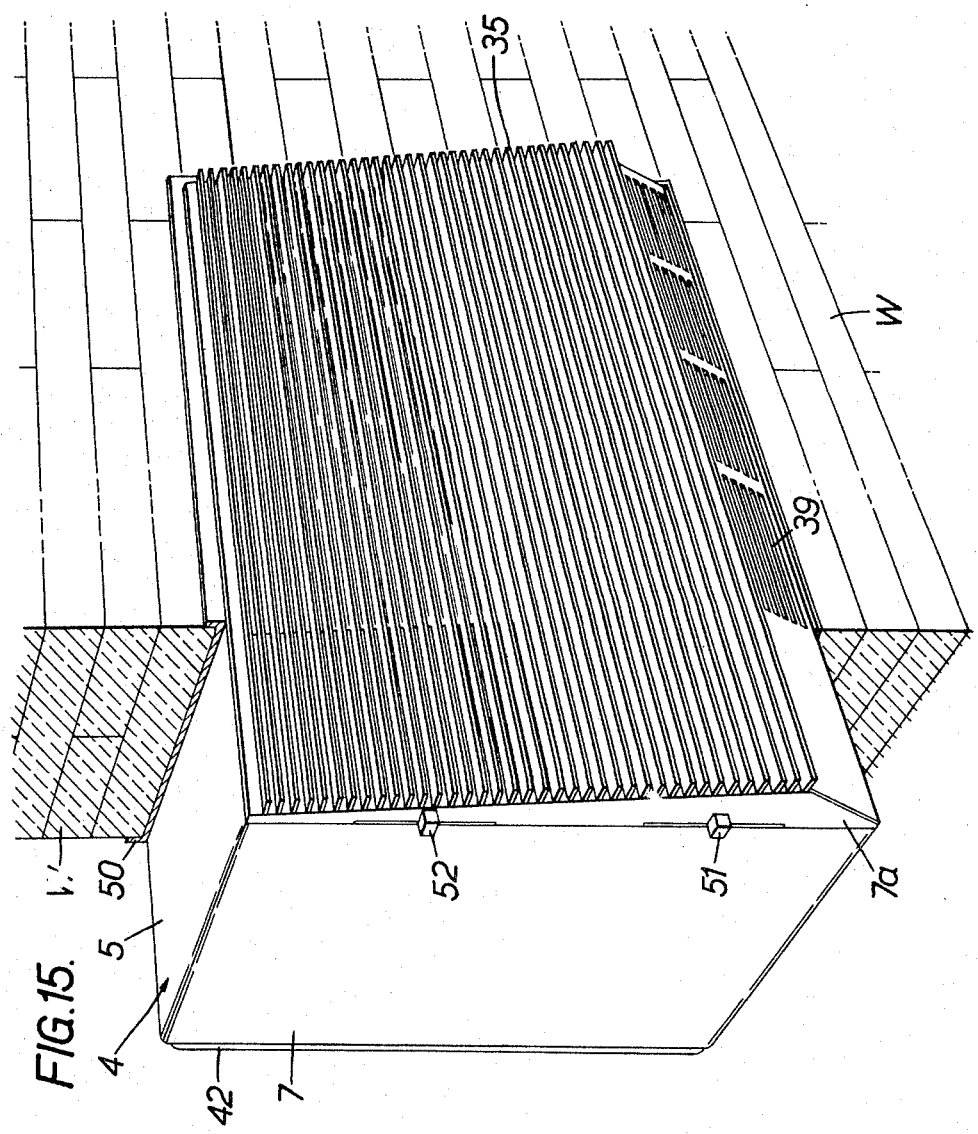

United States Patent Office 3,279,209
Patented Oct. 18, 1966

3,279,209
CROSS FLOW MACHINES AND AIR CONDITIONER UNITS INCORPORATING SUCH MACHINES
Nikolaus Laing, Aldingen, near Stuttgart, Germany, assignor, by mesne assignments, to Laing Vortex, Inc., New York, N.Y.
Original application Apr. 15, 1964, Ser. No. 360,053. Divided and this application Aug. 6, 1965, Ser. No. 477,756
8 Claims. (Cl. 62—426)

This invention relates to machines for inducing movement of fluid, which may be liquid or gas. This invention is a division of my application Ser. No. 360,053 filed Apr. 15, 1964, which is itself a continuation-in-part of my earlier application Ser. No. 132,757 filed August 21, 1961. The invention also relates to air conditioning apparatus.

The invention in its main aspect more particularly concerns flow machines of the cross-flow type, that is machines comprising a cylindrical bladed rotor mounted for rotation about its axis in a predetermined direction and defining an interior space, and guide means defining with the rotor a suction region and a pressure region, the guide means and rotor co-operating on rotation of the latter in said predetermined direction to induce a flow of fluid from the suction region through the path of the rotating blades of the rotor to said interior space and thence again through the path of said rotating blades to the pressure region. More especially the invention concerns flow machines of the cross-flow type wherein the guide means and rotor co-operate to set up a vortex of Rankine character having a core region eccentric of the rotor axis and a field region which guides the fluid so that flow through the rotor is strongly curved about the vortex core. Such flow machines will herein be designated "tangential" machines.

In a "tangential" flow machine, the vortex core region is a zone of relatively low pressure. There will therefore normally be a tendency for ambient air to leak into this zone, more especially from the ends of the rotor. Any such leakage will tend to destroy the vortex, at least at the ends of the rotor, and impair the efficiency of operation. Even if there is no leakage of ambient air at one end of the rotor, due to the fixed end wall at that end of the rotor being without opening, there will nevertheless be some disturbance of air flow where rotating and fixed surfaces adjoin, with attendant loss of efficiency of operation. This reduction of efficiency is particularly serious where a relatively high performance is required, as for example in blowers for air conditioner units. To some extent the disturbing effects referred to can be minimized by carefully designing and constructing the rotor ends and adjacent guide walls. However it is difficult to eliminate end disturbances completely by these means which in any case add to the cost of manufacture.

The invention attacks the problem from a different angle; according to the invention in a "tangential" flow machine means are provided to apply suction to the ends of the rotor in the zone where the vortex core forms, to minimize the leakage and other disturbing effects referred to. If the machine is used in apparatus having a low pressure region or compartment, it suffices that there be openings connecting therewith in the guide walls adjacent the rotor ends. The openings may be those through which leakage would otherwise occur; additional openings may be specially provided.

In application of the invention, in this aspect, to air conditioning apparatus for example, it is proposed to provide an extractor fan for cooling duty in a compartment containing the blower motor and refrigerator unit; the extractor fan reduces the air pressure in this compartment, which is connected to the suction openings referred to and receives at least part of the cooling air therethrough.

Other aspects of the invention relate to air conditioning units. In particular the invention provides a means of disposing of water which collects on the evaporator side. According to the invention this water is led to a sump and a motor-driven belt runs through the sump and picks up the water. This water is skimmed off the belt at a high level and led on to the condenser heat exchanger. The belt may be that used for driving a blower from the motor.

Another aspect of the invention relates to the mounting of two cross flow blower rotors having a belt drive interconnection, in a manner whereby the belt can be changed without dismantling any parts.

The various aspects of the invention will be further described with reference to the accompanying drawings in which the embodiment of the invention is illustrated by way of example.

In the drawing:

FIGURE 8 is a longiutdinal section, partly broken away, of the other blower rotor and the means whereby the driven end thereof is rotatably mounted;

FIGURE 9 is a section similar to that of FIGURE 8 but showing how the non-driven end of the rotor is mounted;

FIGURE 15 is a perspective view showing the unit installed in the wall of a room.

Figure 1:
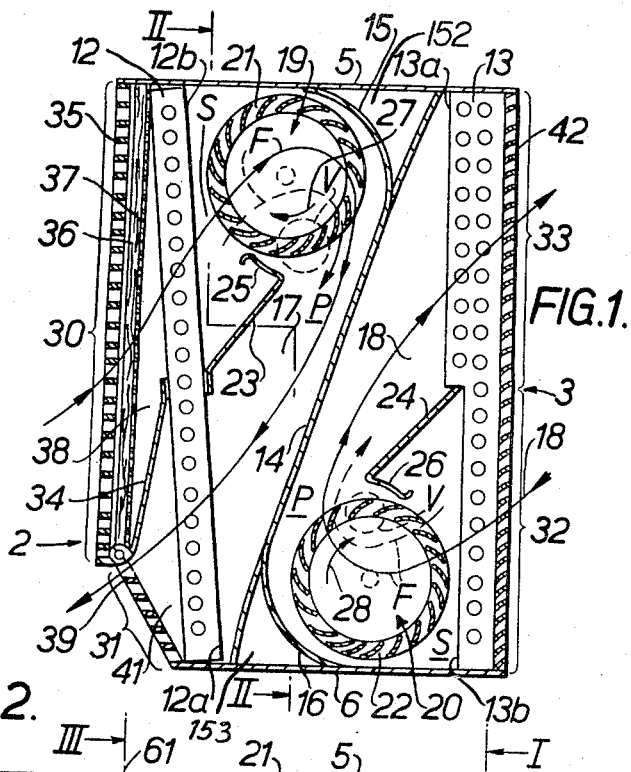
FIGURE 1 is a vertical transverse section through a first form of room air conditioner unit taken on the line I—I of FIGURE 2.
Figure 2:
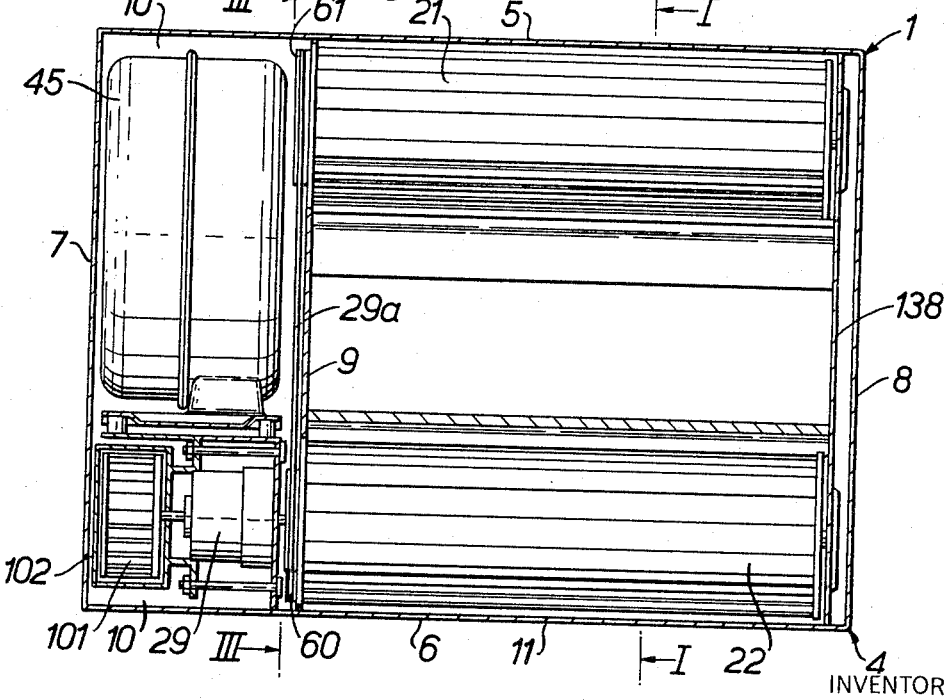
FIGURE 2 is a vertical longitudinal section of the unit taken on the line II—II of FIGURE 1.

Referring first to FIGURES 1 and 2 the room air conditioner unit there shown has the form of a block 1 having a pair of opposite sides 2, 3 which on installation of the unit (as seen in FIGURE 15) are directed respectively towards the room and towards the exterior. A rectangular casing 4 provides horizontal top and bottom walls 5, 6, vertical end walls 7, 8 and a vertical partition wall 9 parallel and close to the end wall 7 which divides the block 1 into a smaller and a larger compartment which compartments are designated respectively 10, 11. Rectangular heat exchanger blocks 12, 13 are disposed in the larger compartment 11 at either side of the block; both heat exchanger blocks 12, 13 extend over the whole area of the compartment as defined between the horizontal walls 5, 6 and the vertical walls 8, 9. The heat exchanger block 12 is slightly inclined downwardly and inwardly; the heat exchanger block 13 is vertical and of double thickness for the top half of its height. A partition wall 14 extends obliquely through the larger compartment 11 from the lower inside edge 12a of the heat exchanger block 12 to the upper inside edge 13a of the heat exchanger block 13. Curved wall portions 15, 16 provide fairings between the partition wall 14 and the upper and lower casing walls 5, 6 respectively. The partition wall 14, fairing 15 and a portion of the upper wall 5 define with the heat exchanger block 12 an air circulation space 17 which as seen in section of FIGURE 1 has the approximate shape of a narrow triangle with its apex downward. The partition wall 14, fairing 16 and a portion of the lower wall 6 define with the heat exchanger block 13 another air circulation space 18 completely separate from the first and also approximately triangular in section with the apex upward.

Within each air circulation space 17, 18 at the wider part thereof is disposed a cross-flow blower designated generally 19, 20 respectively and comprising a blade cylindrical rotor 21, 22 extending adjacent and parallel to one horizontal edge 12b, 13b of the respective heat exchanger block 12, 13 and guide means co-operating with the rotor but well spaced therefrom. Each blower rotor 21, 22 is substantially equal in length to the respective edge 12b, 13b. In each blower 19, 20 the guide means comprises a guide wall 23, 24 extending towards the respective rotor 21, 22 from half-way in the height of the adjacent heat exchanger block 12, 13 and terminating in a portion 25, 26 return-bent towards the heat exchanger and defining with the rotor 21, 22 a gap; in the construction illustrated this converges slightly with the rotor in the direction of rotation thereof shown by the arrow 27, 28 but the gap may instead be parallel. The guide means further includes the adjacent fairing wall portion 15, 16 on the side of the rotors 21, 22 opposite the respective return-bent guide wall portion 25, 26. The rotors 21, 22 are entirely without interior obstruction in the construction illustrated, though a shaft of small diameter can be used at the cost of some loss of efficiency. The rotors 21, 22 are driven in the direction of the arrows 27, 28 by means of a motor 29 located in the smaller compartment 10; the motor drives the rotor 22 direct and the rotor 21 by means of a belt 29a, as will be further described below. In operation, the rotors 21, 22 co-operate with their respective guide means to set up a vortex having a core region, indicated at V, which interpenetrates the path of the rotating blades of the rotor adjacent the guide wall portions 22, 26. Air is induced to pass from a suction region S through the path of the rotating blades of the rotor to the interior thereof and thence again through the path of the rotor blades to a pressure region P. By reason of the vortex flows take place along flow lines, indicated at F which are strongly curved about the vortex core region V to the extent that, in passing through the rotor, the major part of the flow undergoes a change in direction well in excess of 90°. Each cross-flow blower 19, 20 thus draws air through one half of the respective heat exchanger block 12, 13 into the suction region S of the air circulation space 17, 18 in which the blower is situated; the air passes twice through the path of the rotating rotor blades, as described, and is then discharged through the other half of the heat exchanger block. Since each rotor 21, 22 is equal in length to one side edge of the respective heat exchanger block 12, 13 the air flow through the block and through the associated air circulation space takes place substantially along planes which are perpendicular to the rotor axis and to the plane of the heat exchanger block, and the change in flow direction occurs mainly in the rotor, due, as explained, to the vortex.

For each heat exchanger block 12, 13, the inlet and outlet areas, designated respectively 30, 31 and 32, 33 are on the same side.

A flow guide wall 34 extends downwardly from the heat exchanger block 12 opposite the guide wall 23 and forms a continuation of this wall. At its lower edge the wall 34 pivotally mounts a grille 35 holding a filter 36 against an apertured backing member 37 spaced from the adjacent surface of the heat exchanger block 12 and defining therewith an inlet space 38. Forward pivoting of the grille 25 enables the filter 36 to be cleaned or changed. The downwardly extending wall 34 enables the inlet area 30, defined by the grille 35, to be much larger than the area of the heat exchanger block 12 through which air enters the circulation space 17, thus minimising the resistance of the filter 36, which, as will be understood, extends over the whole of the inlet area. A series of horizontal louvres 39 extend over the outlet area 31, defined between the lower edge of the guide wall 34 and the front edge of the bottom casing wall 6. Air leaving the blower 19 flows between the guide wall 23 and the partition wall 14, and since these diverge the air pressure increases and its velocity diminishes. After traversing the lower half of the heat exchanger block 12 the air velocity is increased in the outlet space 41 between the block and the louvres; guided by the louvres 39 the air issues more or less in a horizontal jet of considerable carrying power. The flow in this jet will be substantially laminar and hence physiologically more pleasant to the occupants of the room than a turbulent jet.

The inlet and outlet areas 32, 33 for the heat exchanger block 13 consist simply of the lower and upper halves of its total area, over which extend a series of louvres 42. Air leaving the cross-flow blower 20 is subjected to a pressure increase due to the divergence of the guide wall 24 and the partition wall 14, and this assists the air to traverse the double-thickness upper part of the heat exchanger block 13. The louvres 42 direct the emergent air upwardly to minimise the chance of its being sucked back into the inlet.

A motor driven compressor 45 within the smaller compartment 10 of the block 1 is connected with the heat-exchanger blocks 12, 13 to form a refrigeration apparatus wherein the block 12 is an evaporator and the block 13 a condenser. Thus on the room side of the unit, room air is passed through the filter 36, cooled in passage twice through the block 12 and returned to the room. Rejected heat is dissipated to the exterior atmosphere by the block 13; the thickness of its upper part is double because the temperature differential may be relatively small.

It is emphasised that the apparatus comprising one or other heat exchanger block 12 or 13, its respective cross flow blower 19 or 20 and associated end and rear walling (comprising parts of walls 8, 9 and walls 14 and either 15 and 5 or 16 and 6) can find many useful applications apart from the air conditioner unit herein described. This heat-exchanger block/cross-flow blower combination effectively uses the whole area of the block, by means of a blower which need only impart such energy as is needed for passage through the block, by contrast with prior art arrangements where the blower has also to drive the air through tortuous or confined passageways. The apparatus is moreover compact partly because of the arrangement of the blower closely opposite and parallel to one side edge of the heat exchanger block and the generally triangular-section air circulation space, and partly because the depth of the blower itself can be fairly small.

All these advantages are exploited in the room air conditioner unit described. Because of the triangular-section air circulation space, the two heat exchanger block/cross flow blower combinations can be arranged back to back to take up little more than the depth of one alone. The efficiency of the flow pattern reduces noise, and the reduced blower power required allows for a further noise reduction. The partition wall 14 enables effective sound-insulation against transmission of sheet noises. Further measures to this end will be described below.

As will be seen from FIGURE 15, the room air conditioner unit above described can readily be installed in a rectangular aperture in a wall W, preferably after providing the aperture with a sheet-metal lining 50. Because the depth of the unit is small the louvres 42 may be brought approximately flush with the outer surface of the wall so that the unit will need no special protection from the weather and will not look unsightly. On the room side of the wall W the grille 35 projects slightly together with corresponding portions of the vertical walls 7, 8, 9. The exposed portion 7a of the end wall 7 carries a thermostat control knob 51 and a further control knob 52 for regulating the amount of fresh air to be introduced into the room; the means by which fresh air is introduced will be discussed later.

The room air conditioner unit described can of course be installed in other places besides in a wall; thus it may be installed in a window, where its moderate depth is also an advantage.

Figure 3:
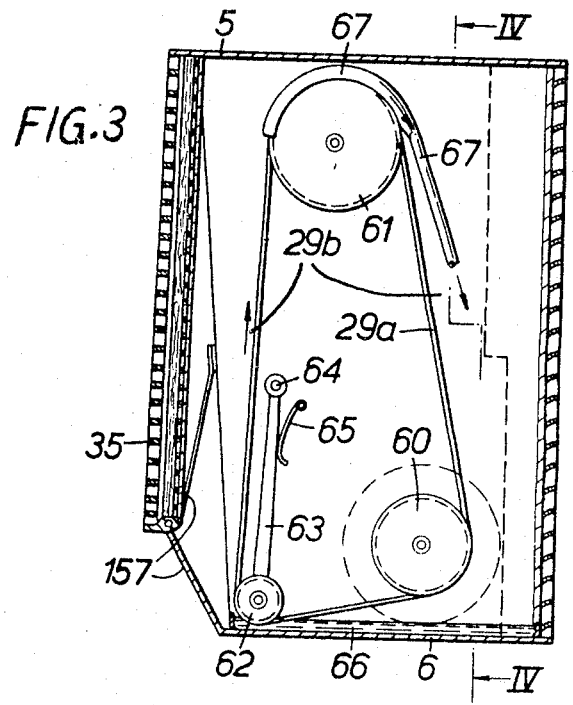
FIGURE 3 is a vertical transverse section through the unit, taken on the line III—III of FIGURE 2.

It has been explained with reference to FIGURES 1 and 2 that the blower rotors 21, 22 are driven by a motor 29, the rotor 22 directly and the rotor 21 by a belt 29a; the arrangement of this belt is shown in FIGURE 3. The belt 29a is trained over a driving pulley 60 which forms a part of one end member of the rotor 22 and over a driven pulley 61 which forms a part of the corresponding end member of the rotor 22. The belt 29a driven in the direction of the arrows 29b and tensioned by means of an idler pulley 62 rotatably mounted upon a lever 63 pivotally supported at 64 and acted upon by a spring 65. It will be seen that the driven pulley 61 is of larger diameter than the driving pulley 60, so that the rotor 21 on the room side of the unit rotates at a lower speed than the rotor 22. As will be appreciated any noise produced by the rotor 21 is transmitted directly to the room, so that this rotor should rotate at the lowest speed consistent with the duty it has to perform. Noise from the rotor 22 is rejected to the exterior and cannot enter the room by reason of the partition wall 14, so that the rotor 22 can be run at any desired speed. Since, as already observed, the temperature differential at the condenser heat exchanger block 13 will generally be less than that at the evaporator block 12, a greater speed for the rotor 22 is desirable.

Figure 4:
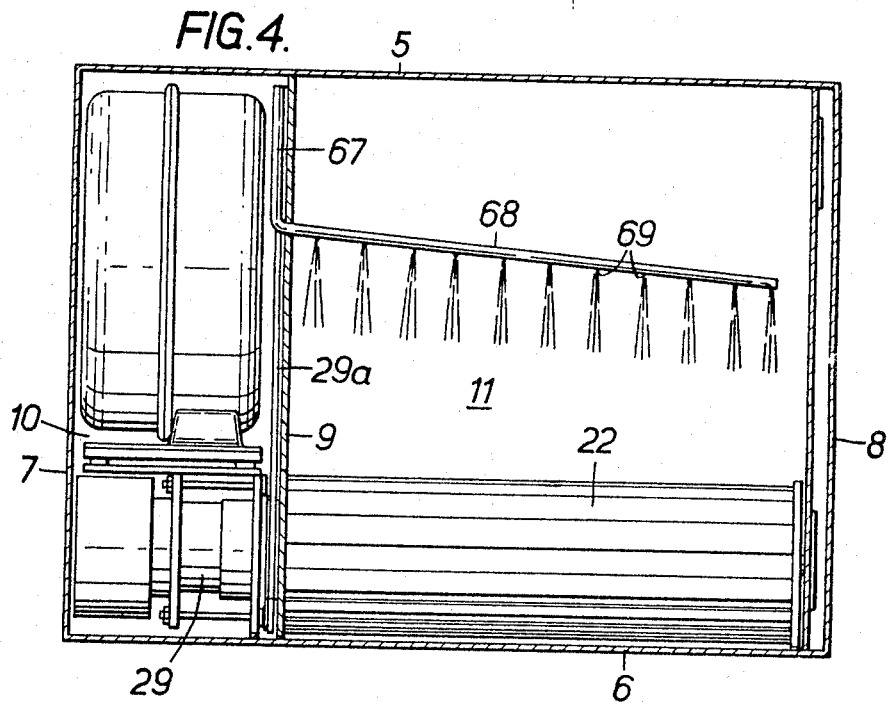
FIGURE 4 is a vertical longitudinal section of the unit taken on the line IV—IV of FIGURE 3.
Figure 5:
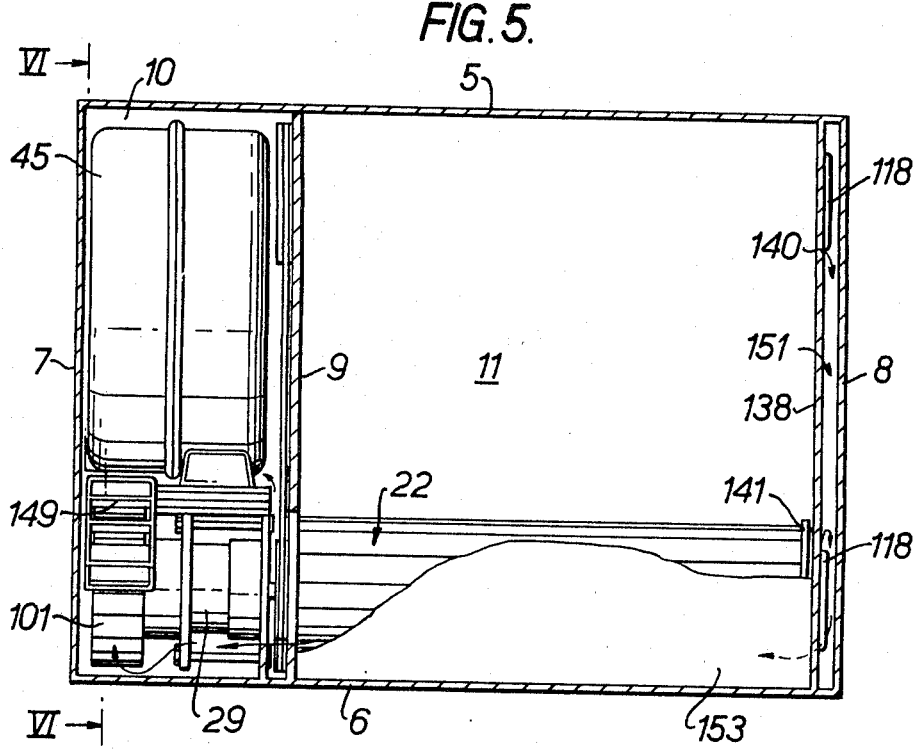
FIGURE 5 is a further vertical longitudinal sectional view of the unit taken on the line V—V of FIGURE 6, wherein a blower rotor and a fairing wall portion are partially cut away to show a duct behind them.
Figure 6:
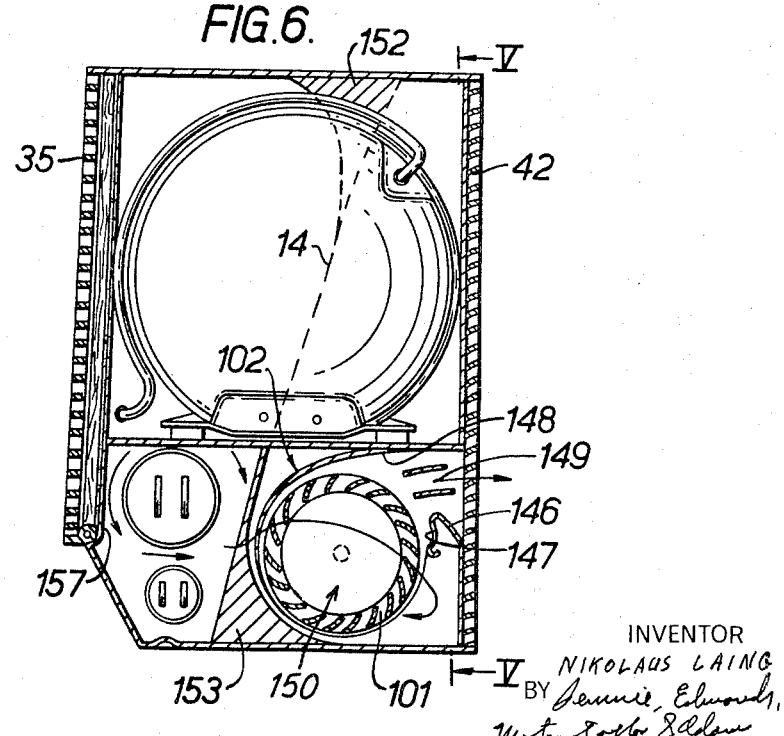
FIGURE 6 is a further vertical transverse section of the unit taken on the line VI—VI of FIGURE 5.

One of the problems encountered with room air conditioner units is the disposal of the water which condenses on the evaporator. In the unit of FIGURES 1 to 15 this problem is solved by providing a sump 66 (FIGURE 3) for this water in the bottom of the smaller compartment 10 of the block 1 and locating the idler pulley 62 so that the belt 29a passes through the sump on its way up to the driven pulley 61. The belt 29a, which is preferably of round cross-section and of fibrous material, picks up water from the sump 66 and carries it to the driven pulley 61 where it is flung off by centrifugal force against a splash-guard 67 placed around the pulley and led by the splash-guard into a duct 68 (FIGURE 4) extending with a gentle downward slope through the pressure region P of the air circulation space 18. The duct 68 is pierced at intervals with holes 69 through which the water drops. This water falls upon the blades of the blower rotor 22 and is broken into tiny droplets which are then carried off in the warm air stream passing from the blower to the evaporator heat exchanger block 13. Some of the droplets collect on the block 13 and improve the heat dissipation therefrom by their evaporation. Excess water collected on the block 13 returns to the sump 66.

Figure 7:
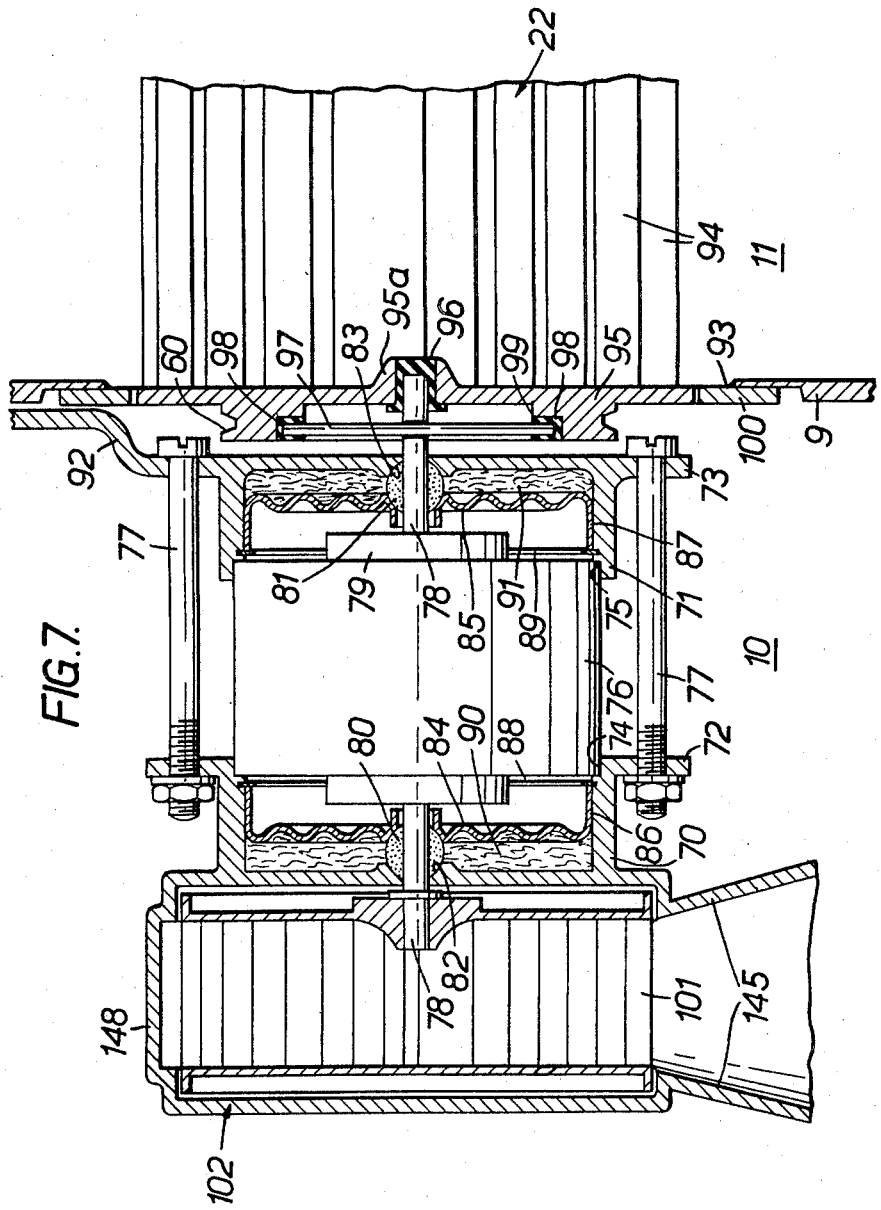
FIGURE 7 is a longitudinal section of the driving motor for the blowers of the unit showing the mounting of the motor and a portion of one blower rotor together with certain other parts which it drives.
Figure 10:
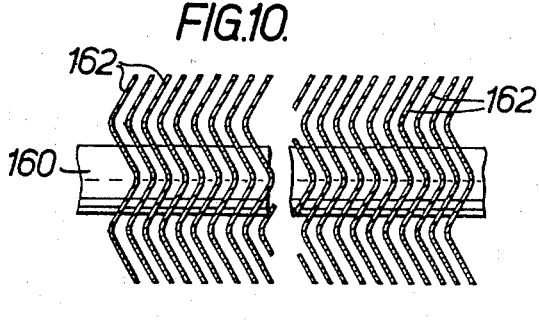
FIGURES 10 to 13 are scrap views illustrating different features of heat exchangers forming part of the air conditioner unit.
Figure 11:
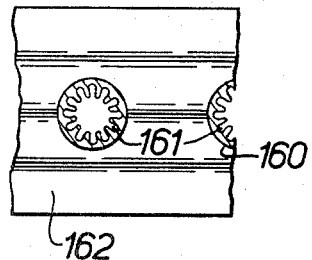

FIGURE 7 shows the mounting of the motor 29 and of the rotor 22 directly driven thereby. The motor 29, which is of the A.C. induction type, comprises a pair of end members 70, 71 in the form of inwardly facing cups with outwardly extending flanges 72, 73. The end members 70, 71 provide shoulders 74, 75 which receive and locate the stack 76 of laminations forming the poles of the motor. Bolts 77 interconnect the flanges 72, 73 of the end members 70, 71 and clamp these members together about the lamination stack 76. The motor shaft 78, which carries the motor armature 79, is rotatably supported from the end members 70, 71 through self-aligning bearing bushes 80, 81 of sintered material and spherical exterior formation. The bushes 80, 81 are urged into axially disposed seating recesses 82, 83 of complementary shape in the end members 70, 71 by means of annularly corrugated retainer elements 84, 85 of resilient sheet material each having a central portion in contact with the respective bush and an axial flange 86, 87 engaged within the respective end member and located in position by a circlip 88, 89. Each retainer element 84, 85 also holds against the respective end member 70, 71 a wad 90, 91 of fibrous material saturated with lubricating oil and surrounding the corresponding bush 80, 81 to form an oil store therefor.

The motor end member 71 has an integral extension in the form of an arm 92 which projects upwards close to the vertical partition wall 9 and is secured thereto by means not shown.

The motor shaft 78 extends through a wide circular aperture 93 in the partition wall 9 and mounts one end of the rotor 22. The rotor comprises a series of blades 94 arranged in a ring and supported between a pair of end members of which only one, designated 95, is shown in the figure. This end member 95 has the form of a disc located within the aperture 93 in alignment with partition wall 9 and having an integral annular extension within the compartment 10 providing the pulley 60 previously described. The end member 95 has a centrally apertured boss 95a receiving a soft rubber bushing 96 into which one end of the motor shaft 78 projects so that the bushing is compressed between the shaft and the boss. A pin 97 extends through a radial bore in the shaft 78 and has its ends seated against soft rubber blocks 98 received in radial recesses 99 in the annular extension forming the pulley. Thus the rotor 22 is supported on the motor shaft 78 in a manner permitting, by reason of the elastic bushing 96, minor misalignment between their respective axes. The shaft drives the rotor through the pin 97 which can also accommodate such misalignment. Thus despite the length of the rotor 21 the bearings therefor will not seize or impose undue braking torque should the alignment thereof become slightly upset through distortion of the casing 4 e.g. on installation or transport; moreover it is unnecessary to take special precautions to secure alignment on assembly, and a cheaper construction becomes possible.

A sealing ring 100 fixed to the partition wall 9 about the aperture 93 therein closely surrounds the end member 95; this ring is finally secured in position after assembly of the motor 29 and rotor 22.

The end of the motor shaft 78 opposite the rotor 22 supports rigidly in overhang fashion a cylindrical bladed rotor 101 of short axial length. The motor end member 70 is formed integrally with a casing 102 enclosing the rotor 101. The rotor 101 and casing 102 therefor will be further described hereafter.

The non-driven end of the rotor 22 (not illustrated in FIGURE 7) is supported in the manner described with reference to FIGURE 9 for the non-driven end of the rotor 21.

The mounting of the rotor 21 is illustrated in FIGURES 8 and 9. Like the rotor 22 this rotor 21 comprises a series of blades arranged in a ring and supported between end supports, the blades and end supports being here designated 110, 111 and 112 respectively. However, unlike the rotor 22, the rotor 21 delivers air to the room and it is therefore necessary to minimize noise transmission into the air circulation space where the rotor 21 is situated and maximise efficiency so that the rotor can be run as slowly as possible whereby to generate least noise. These requirements dictate certain special features of the rotor mounting, as will be seen from the following detailed description thereof.

Both the rotor end members 111, 112 are basically discs each with an inwardly directed boss 113 carrying an outwardly projecting stub shaft 115. Each stub shaft 115 is received in a bearing bush 116 formed of sintered material. The bearing bushes 116 are flexibly mounted within fixed bearing support members 117, 118 which are of shallow cup-like formation, each having a flat bottom 117a, 118a and a rim 117b, 118b. A series of projections 119 arranged in a ring about the rotor axis extend from each of the bearing support members 117, 118 and surround the outer end of the respective bush 116 in slightly spaced relation thereto. Each bush 116 is formed with an annular groove midway between its ends which locates an O-ring 120, and this O-ring is clamped between the projections 119 and a central annular portion 121 of a centrally apertured retainer disc 122 of resilient sheet metal the outer periphery of which is secured to the rim 117b, 118b of the respective bearing support members 117, 118. By these means the bearing bushes 116 are able to move slightly to accommodate minor misalignment of the stub shafts 115 or of the bearing support members. Thus, as with the mounting of the rotor 22 there is no need to take special precautions to establish and maintain perfect alignment.

An annular wad 123 of lubricant-soaked fibrous material fills the space between each bearing support member 117, 118 and the associated bearing bush retainer disc 122 to provide a store of lubricant for the bush 116, the lubricant reaching the bush through the spaces between the projections 119. Any lubricant thrown off the extreme end of each stub shaft is returned direct to the wad 123; a splash ring 124 is mounted on each stub-shaft 115 between the bush 116 and the boss 113 of the respective rotor end members 111, 112 and oil leaking from the bush in the direction of the rotor is thrown off by the splash ring against a tubular extension 125 of the central portion 121 of the retainer disc 122 which extension surrounds the splash ring and has an inturned lip 126 on the rotor side thereof, the lip and extension guiding the oil back to the wad 123.

The rotor end member 111 carries at its periphery a flange 127 having laterally and radially outwardly directed portions 128, 129 respectively, the latter portion 129 being formed integrally with a ring 129a extending laterally inwardly thereof and providing the pulley 61 previously referred to. The plane containing the belt 29a (see FIGURES 3 and 4) passing over this pulley 61 intersects the bearing bush 116 at about midway between its ends, so that belt tension does not introduce undesirable bending movements in the assembly. The bearing support member 117 has an integral extension in the form of an arm 130 which projects downwardly close to the partition wall 9, and is secured thereto at 131; this arm 130 may form a continuation of the arm 92 (see FIGURE 7) by which the motor 29 is supported. By mounting the bearing support member 117 and motor 29 solely on the arms 130, 92 it becomes possible to assemble the belt 29a over the pulleys 60, 61, or remove it therefrom, without previously dismantling any parts.

The rotor end member 111 is positioned within a circular aperture 132 in the partition wall 9. A ring 133 fixed to the wall 9 about the aperture 132 extends close up to the periphery of the rotor end member 111 and has an outwardly directed annular flange 134 which projects laterally between the ring 129a and the outwardly directed flange portion 128 on the member 111 so that there is formed a narrow tortuous annular gap 135 providing the sole communication at this end of the rotor 21 between the compartment 10 and the air circulation space 17 containing this rotor whereby to minimise transmission of noise between them.

Figure 14:
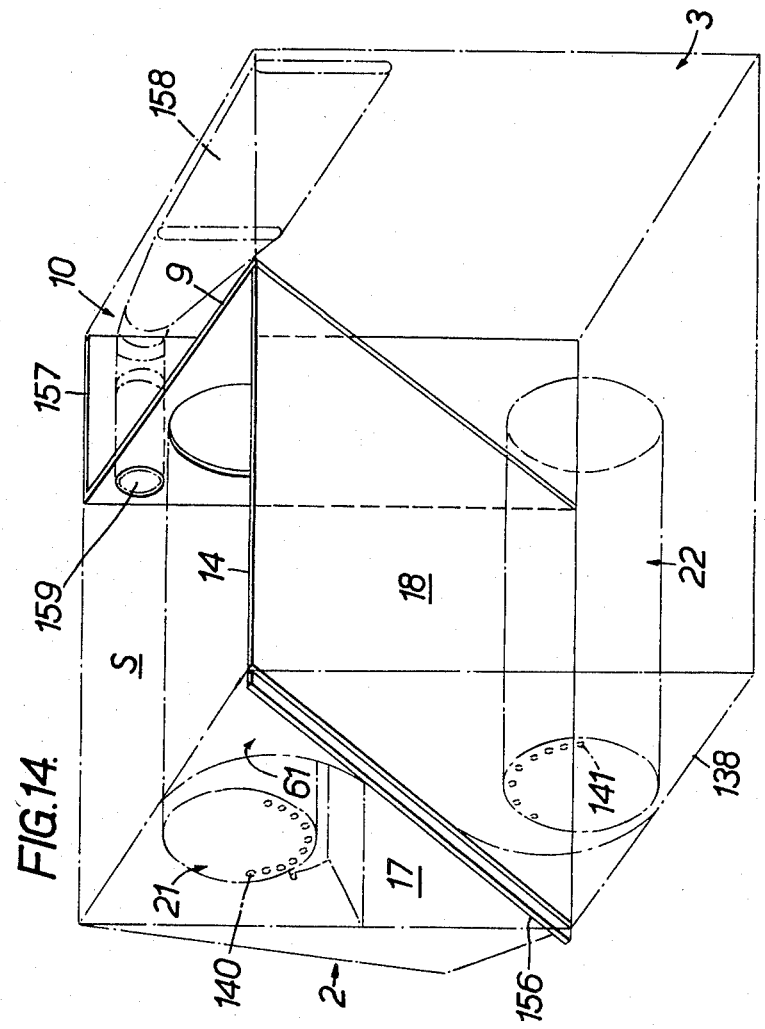
FIGURE 14 is a ghost perspective view of the unit; illustrating the sound-insulating walls of the unit.

The bottom 118a of the bearing support member 118 projects radially outwardly beyond the rim 118b previously mentioned and carries an outer rim 136 with a radially extending flange 137 secured to a wall 138 which is close and parallel to the end wall 8 of the casing 4 (see FIGURE 2). The rotor end member 112 has at its periphery a flange 139 which extends laterally outwardly between the rims 118b, 136 of the bearing support member 118. The bearing support member 118 is formed with holes 140 between the rims 118b, 136 over an arc, as will be best seen in FIGURE 14. It has been explained that the non-driven end of the rotor 22 is also supported in the manner shown in FIGURE 9. For this rotor, too, holes may be provided similar to the holes 140; such holes are shown in FIGURE 14 where they are designated 141. The purpose of these holes 140, 141 is explained below.

As will be seen from FIGURES 8 and 9, the rotor end members 111, 112 and the support means therefor are designed to present, to air flow through the rotor 21, surfaces which (apart from the bosses 113) are flat and flush with the adjacent surfaces of the walls 9, 138 bounding the circulation space 17 at either end of the rotor; as will be understood, the object of this is to minimise disturbance of the air flow at the ends of the rotor. However some disturbance of the air flow at the ends of the rotor 21 may occur despite precautions just mentioned, and it may be desirable to provide auxiliary walls 142, 143 on the pressure side of the rotor which reject flow from immediately adjacent the ends of the rotor; these walls diverge in the direction of flow and merge into the walls 9, 138 at a point downstream.

It will be recalled that the cross-flow blowers 19, 20 are of the "tangential" type and operate by the formation of a vortex of Rankine type having a core region which interpenetrates the path of the rotor blades adjacent the guide wall portions 25, 26, as shown in FIGURE 1. Now as explained above the core region is a region of low static pressure, so that air will tend to flow into this region from the surroundings through clearance spaces at the ends of the rotor, and thereby impair the vortex and hence the blower efficiency near the ends of the rotor. The air conditioner unit described provides means to counteract this. As already mentioned the blower motor 29 drives a cross-flow rotor 101 within a casing 102 (see FIGURES 5, 6 and 7). This casing 102 provides for the rotor 101 guide surfaces which correspond generally to those associated with the rotors 21, 22; thus the casing includes end walls 145, a guide wall 146 corresponding to the guide walls 23, 24 and having a return-bent portion 147 converging with the rotor, and a second guide wall 148 opposite the wall 146, the walls 145, 146 and 148 defining a diffusing outlet region 149 discharging to the side 3 of the block 1 facing the exterior. The rotor 101 and casing 102 co-operate to form a cross-flow blower designated generally 150 (see FIGURE 6) and functioning in the same manner as the blowers 19, 20; no further description of this blower will accordingly be required. Air reaches the rotor 101 from the compartment 10, which communicates with the narrow space 151 (see FIGURE 5) between the end wall 8 and the rotor-bearing support wall 138 by the ducts 152, 153 (see FIGURES 1 and 6) formed between the partition walling 14 and on the one hand the upper casing wall 5 and facing wall portion 15 and on the other hand the bottom casing wall 6 and the facing wall portion 16. In this way the blower 150 sucks air out through the holes 140, 141 into the space 151 and thence through the ducts 152, 153 to the compartment 10, whence the air passes through the blower and discharges to the exterior. In addition certain amount of air is sucked direct into the compartment 10 through the gaps around the rotor end members 95 and 111. The air passed through the blower serves to cool the compressor 45 and the motor 29. However, since the air is taken largely from the vortex core regions (shown at V in FIGURE 1) near the ends of the rotors 21, 22, where otherwise air would tend to enter and spoil the vortex, the effect is also to strengthen and stabilise these regions and hence improve the performance of the blowers 19, 20 near the ends of the rotors. It will be appreciated that by rendering the flow through the blowers 19, 20 substantially uniform over their length the efficiency of the heat-exchanger block/ blower unit combinations may be correspondingly improved.

The sound insulation arrangement of the room air conditioner unit is shown in FIGURE 14. The partition wall 14 provides complete sound insulation between the air circulation space 18 facing the exterior, and the room side 2 of the unit. This wall 14 has an extension 156 providing a similar partition in the space 151. The small compartment 10 where the compressor 45 and blower motor 29 is situated is insulated from the room side 2 of the unit by an insulating wall 157 at this side of the compartment, and by the portion of the transverse wall 9 between this wall and the partition wall 14. Chiefly for appearance sake the grille 35 extends over the whole width of the unit between the end walls 7, 8; the wall 157 blocks off flow through the grille over the area opposite the compartment 10.

The various sound-insulating walls have been shown simply as made of sheet metal, but it will be appreciated they may be made of, or lined with, a sound-deadening material.

To introduce fresh air into the room, a flat narrow tube 158 extends from behind the louvres 42 on the exterior side 3 of the unit and through the compartment 10 thereof; in this compartment the tube 158 merges into a round tube 159 leading into the suction region S of the circulation space 17 on the room side 2 of the unit. The blower 19 sucks fresh air through the tubes 158, 159 into this space, where it mixes with air drawn in from the room and is expelled thereto through the lower half of the heat exchanger block 12. A control valve (not shown) in the tube 158 manually controllable by the knob 52 previously referred to provides for regulation of the proportion of fresh air admitted. The tubes 158, 159 are preferably lined with sound-deadening material to inhibit the transmission therethrough of traffic noises from the exterior.

The heat exchanger blocks 12, 13 may be of conventional construction. A preferred construction is however shown in FIGURES 10 and 11 where tubing 160 having a bore 161 of stellate section extends through a multiplicity of closely spaced fins in the form of strips 162 of heat-conductive metal which are each corrugated lengthwise. The corrugated strips 162 provide for a more rapid transfer of heat to the air flowing past them than would be the case without the corrugations, whilst the stellate bore 161 ensures a correspondingly rapid heat transfer between the refrigerant and the tubing 160. Instead of forming the tube 160 with a stellate bore 161, a cylindrical bored tube can be used which is provided with an internal wire spiral to improve heat transfer between the refrigerant and the tube.

Figure 12:
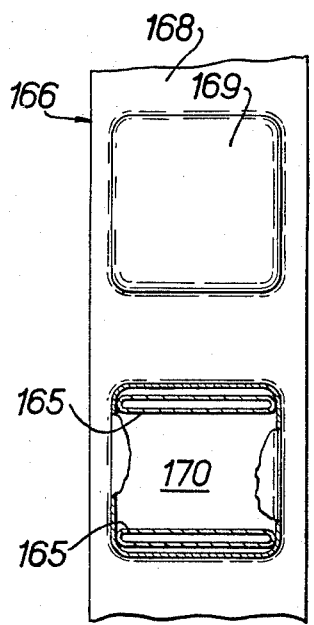
Figure 13:
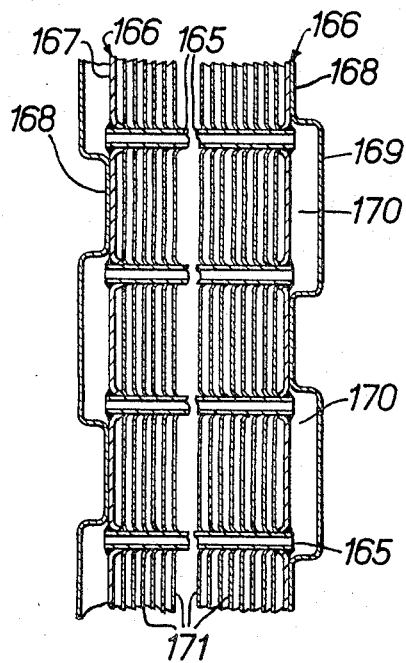

Another preferred construction of heat exchanger is shown in FIGURES 12 and 13. Here flat tubes 165 of sheet metal extend horizontally between end members 166 each formed by a first sheet metal strip 167 through which the end of the tubes 165 project and a second sheet metal strip 168 having rectangular dished portions 169, the strips being secured together at their edges and intermediate the dished portions. Each dished portion 169 provides with the first strip 167 a connecting space 170 in register with a pair of adjacent tubes 165, the connecting spaces of one end member 166 being staggered with respect to those of the other. Thus refrigerant flows through one tube 165 to (say) a connecting space 170 of the left-hand end member 166 and thence through the next lower tube to the right-hand end member, where it is transferred through a connecting space thereof to the next lower tube of flow leftwards again. Closely spaced corrugated fins 171 similar to the strips 162 of FIGURES 10 and 11 extend normally to the tubes 165 and extend the heat-exchanging area thereof.

The flat tubes 165 provide more effective heat transfer than round tubes would. The end members 166 take up very little space.

I claim:
1. A flow machine comprising a cylindrical bladed rotor mounted for rotation about its axis and defining an interior space, guide means defining with the rotor an entry region and a discharge region, the guide means and rotor co-operating on rotation of the latter to set up a vortex of Rankine character having a core region eccentric of the rotor axis and a field region whereby a flow of fluid is set up from the entry region through the path of the rotating blades of the rotor to the interior space and thence again through the path of the rotating blades to the discharge region, and means to apply suction adjacent at least one end of the rotor in the vicinity of the core region.

2. A flow machine comprising: a cylindrical bladed rotor having a pair of end members, and a series of similar blades extending between the end members and arranged in a ring about the rotor axis to define an interior space; means mounting the rotor for rotation about its axis; a pair of end walls in substantial alignment with the ends of the rotor and a pair of guide walls extending between the end walls said rotor and said walls together defining an entry region and a discharge region, the guide walls and rotor co-operating on rotation of the latter to set up a vortex of Rankine character having a core region eccentric of the rotor axis and a field region whereby a flow of fluid is set up from the entry region through the path of the rotating blades of the rotor to the interior space and thence again through the path of the rotating blades to the discharge region; and means to apply suction to an opening in at least one end wall adjacent the periphery of the corresponding rotor end member.

3. A flow machine as claimed in claim 2, wherein said one end wall is formed with an aperture to receive the corresponding rotor end member and the opening is defined between rotor end member and the end wall about the aperture.

4. A flow machine as claimed in claim 3, wherein said opening is in the form of an annular labyrinth.

5. A flow machine as claimed in claim 2, wherein said one end wall is recessed to receive the rotor end member and said opening is formed in the recessed part of the end wall.

6. Apparatus comprising: a first compartment having a pair of end walls and a second compartment; a bladed cylindrical rotor having a pair of end members and a series of similar blades extending between the end members and arranged in a ring about the rotor axis to define an interior space; means mounting the rotor for rotation about its axis in said first compartment with the rotor end members in substantial alignment with the end walls of said compartment, a pair of guide walls interconnecting said end walls and spaced on opposite sides of the rotor to define therewith an entry region and a discharge region, the guide means and rotor co-operating on rotation of the latter to set up a vortex of Rankine character having a core region eccentric of the rotor axis and a field region whereby a flow of fluid is set up from the entry region through the path of the rotating blades of the rotor to the interior space and thence again through the path of the rotating blades to the discharge region; means producing a pressure in the second compartment which is at least as low as that of the vortex region; and means forming a fluid passage between the second compartment and the first compartment adjacent at least one rotor end member.

7. Apparatus as claimed in claim 6, wherein said pressure producing means in the second compartment is an extractor cooling fan driven with said rotor by a common drive means.

8. Apparatus comprising a casing containing a first compartment having a pair of end walls and a second compartment one of said end walls forming a dividing wall between said compartment, a bladed cylindrical rotor having a pair of end members and a series of similar blades extending between the end members and arranged in a ring about the rotor axis to define an interior space; means mounting the rotor for rotation about its axis in said first compartment with one rotor end member located in an aperture in the dividing wall and defining therewith an annular opening and the other end member adjacent the other end wall, a pair of guide walls interconnecting said end walls and spaced on opposite sides of the rotor to define therewith an entry region and a discharge region, the guide means and rotor co-operating on rotation of the latter to set up a vortex of Rankine character having a core region eccentric of the rotor axis and a field region whereby a flow of fluid is set up from the entry region through the path of the rotating blades of the rotor to the interior space and thence again through the path of the rotating blades to the discharge region; and an extractor fan in the second compartment producing a pressure at least as low as the pressure in said vortex region to effect suction from the first compartment through said annular opening.

References Cited by the Examiner
UNITED STATES PATENTS

| | | | |
|---|---|---|---|
| 1,884,898 | 10/1932 | Smith | 62—426 |
| 2,883,837 | 4/1959 | Rose | 62—280 |
| 2,896,424 | 7/1959 | Rose | 62—280 |
| 2,909,043 | 10/1959 | Baker | 62—426 |
| 2,942,773 | 6/1960 | Eck | 230—125 |
| 3,178,100 | 4/1965 | Datwyler | 230—125 |
| 3,200,609 | 8/1965 | Laing | 62—280 |

WILLIAM J. WYE, *Primary Examiner.*